(12) United States Patent
Matsushita

(10) Patent No.: US 11,566,711 B2
(45) Date of Patent: Jan. 31, 2023

(54) BUTTERFLY VALVE

(71) Applicant: ASAHI YUKIZAI CORPORATION, Nobeoka (JP)

(72) Inventor: Kotaro Matsushita, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 0 days.

(21) Appl. No.: 17/178,143

(22) Filed: Feb. 17, 2021

(65) Prior Publication Data

US 2021/0172531 A1 Jun. 10, 2021

Related U.S. Application Data

(63) Continuation of application No. 16/319,267, filed as application No. PCT/JP2017/026141 on Jul. 19, 2017, now Pat. No. 11,054,041.

(30) Foreign Application Priority Data

Jul. 20, 2016 (JP) ................................ 2016-142416

(51) Int. Cl.
*F16K 1/22* (2006.01)

(52) U.S. Cl.
CPC ............... *F16K 1/224* (2013.01); *F16K 1/22* (2013.01)

(58) Field of Classification Search
CPC .......... F16K 1/224; F16K 1/22; F16K 1/2268; F16K 1/222
See application file for complete search history.

(56) References Cited

U.S. PATENT DOCUMENTS 3,186,682 A ‡ 6/1965 Pierson ................. F16K 1/2268
    251/30
4,146,206 A * 3/1979 Malloy ..................... F16K 1/22
    251/84

(Continued)

FOREIGN PATENT DOCUMENTS

EP      2843282 A1     3/2015
EP      2843282 A1 ‡   3/2015    ........... F16K 41/046

(Continued)

OTHER PUBLICATIONS

International Search Report for PCT/JP2017/026141, dated Oct. 17, 2017.‡

(Continued)

*Primary Examiner* — Michael R Reid
(74) *Attorney, Agent, or Firm* — Merchant & Gould P.C.

(57) ABSTRACT

In this butterfly valve (10) provided with: a main body (11); valve shafts (13, 14); and a valve body (30) that is rotatable with respect to the main body, the valve body is formed integrally from a core material (32) and a contour forming member (31) that is formed from a synthetic resin material and that encircles the core material and forms the contour of the valve body. The valve body has bearing holes (33, 34) that support the valve shafts, the contour forming member has a bearing inner peripheral part (36) that forms at least a part of the inner peripheral surface of each of the bearing holes, the contour forming member is formed continuously with the bearing inner peripheral part, and the core material has a bearing reinforcing part (35) that supports the bearing inner peripheral part of the contour forming member, radially outside from the rotation axis of the valve body.

9 Claims, 10 Drawing Sheets

(56) References Cited

U.S. PATENT DOCUMENTS

| | | | | |
|---|---|---|---|---|
| 4,604,254 | A | ‡ | 8/1986 | Yamamoto .......... F16K 27/0272 264/25 |
| 5,722,884 | A | ‡ | 3/1998 | Komowski ........ B60H 1/00664 29/463 |
| 7,895,989 | B2 | * | 3/2011 | Bessho ................ F16K 1/2261 123/337 |
| 11,054,041 | B2 | * | 7/2021 | Matsushita ............. F16K 1/222 |
| 2012/0168659 | A1 | ‡ | 7/2012 | Ozaki .................. F16K 1/2265 251/30 |
| 2016/0201808 | A1 | * | 7/2016 | Zhang .................. F16K 1/2261 251/306 |

FOREIGN PATENT DOCUMENTS

| | | | | | |
|---|---|---|---|---|---|
| JP | S62-97370 | U | | 6/1987 | |
| JP | S62-97370 | U | ‡ | 6/1987 | |
| JP | 2000-170926 | A | ‡ | 6/2000 | |
| JP | 2000-170926 | A | | 6/2000 | |
| JP | 2007-032683 | A | | 2/2007 | |
| JP | 2007-032683 | A | ‡ | 2/2007 | |
| JP | 3877885 | B2 | | 2/2007 | |
| JP | 3877885 | B2 | ‡ | 2/2007 | |
| JP | 2011-58509 | A | | 3/2011 | |
| JP | 2011-58509 | A | ‡ | 3/2011 | |
| JP | 2016-070396 | A | | 5/2016 | |
| JP | 2016-070396 | A | ‡ | 5/2016 | ............... F16K 1/22 |
| KR | 10-2011-0087767 | A | | 8/2011 | |
| KR | 10-2011-0087767 | A | ‡ | 8/2011 | |
| WO | 2015/147197 | A1 | | 10/2015 | |
| WO | WO-2015/147197 | A1 | ‡ | 10/2015 | ........... F16K 1/2265 |

OTHER PUBLICATIONS

Office Action for Korean Patent Application No. 10-2019-7001277 (dated May 10, 2021).‡

\* cited by examiner
‡ imported from a related application (a)

(b)

(a)

(b)

(a)

(b)

BUTTERFLY VALVE

This application is a Continuation of U.S. patent application Ser. No. 16/319,267, filed on Jan. 18, 2019, which is a National Stage Application of PCT/JP2017/026141, filed Jul. 19, 2017, which claims benefit of Japanese Patent Application No. 2016-142416, filed Jul. 20, 2016, which applications are incorporated herein by reference. To the extent appropriate, a claim of priority is made to each of the above-disclosed applications.

FIELD

The present invention relates to a butterfly valve having a valve body containing a core member inside.

BACKGROUND

A butterfly valve is used for controlling the flow of hydrochloric acid or other corrosive fluid. To raise the corrosion resistance and chemical resistance of such a butterfly valve, the past practice has been to form the valve body from a plastic material. Further, in recent years, larger sizes of butterfly valves with valve bodies formed from plastic materials and higher temperatures of the ranges of usage temperatures have been particularly sought. However, with a valve body made of a plastic material, as the temperature of the fluid circulating through the butterfly valve rises or as the size of the butterfly valve becomes larger, it gradually becomes more difficult to obtain the required strength. In particular, when the valve body is a type supported by a valve shaft divided into two parts, the stress occurring at the bearing hole of the valve body supporting the valve shaft becomes higher and as a result sometimes the problem arises of the bearing hole deforming.

To deal with the above-mentioned problem, as described in PTL 1, the conventional practice has been to reinforce a plastic valve body with a metal core member sealed inside it.

CITATION LIST

Patent Literature

[PTL 1] Japanese Patent No. 3877885

SUMMARY

Technical Problem

The valve body of the butterfly valve of PTL 1 is reinforced by a core member made of a metal arranged inside of it, but would appear to be unable to be used for controlling the flow of a corrosive fluid. That is to say, the valve body of PTL 1 is covered by a plastic material in the major part of the outside surface, including the opening edge of the bearing hole, but the metal core member is exposed at the bearing hole into which the fluid may flow. Note that, a bearing hole is usually sealed by a seat ring or other seal member and the opening edge of the bearing hole, but often the plastic opening edge deforms due to a high temperature or aging resulting in the seal of the bearing hole being broken.

The present invention is made in consideration of the above situation and has as its object the provision of a butterfly valve having a valve body provided with strength, corrosion resistance, and chemical resistance.

Solution to Problem

To realize the above-mentioned object, according to the present invention, there is provided a butterfly valve comprising a main body, valve shaft, and valve body able to rotate with respect to the main body, wherein the valve body is integrally formed from a core member and a contour forming member made of a plastic material surrounding the core member to form a contour of the valve body and has a bearing hole supporting the valve shaft, the contour forming member has a bearing inner peripheral part forming at least part of an inner peripheral surface of the bearing hole, the contour forming member is continuously formed including also the bearing inner peripheral part, and the core member has a bearing reinforcing part supporting the bearing inner peripheral part of the contour forming member from radially outside of a rotational axis of the valve body.

Advantageous Effects of Invention

In the butterfly valve according to the present invention, at least part of the bearing hole of the valve body is formed by the bearing inner peripheral part made of a plastic material without the core member being exposed, while the bearing inner peripheral part is supported by part of the core member, that is, the bearing reinforcing part, from radially outside. For this reason, the part formed by the bearing inner peripheral part of the bearing hole has a sufficient corrosion resistance, while, even if controlling the flow of high temperature fluid, it is resistant to deformation. As a result, when using that part to seal the fluid, a high sealing ability can be maintained. Further, the plastic material forming the bearing inner peripheral part is connected with the surrounding plastic material. This also contributes to keeping the bearing hole from deforming.

DESCRIPTION OF EMBODIMENTS

Below, referring to the attached drawings, a butterfly valve 10 according to an embodiment of the present invention will be explained.

Figure 1:
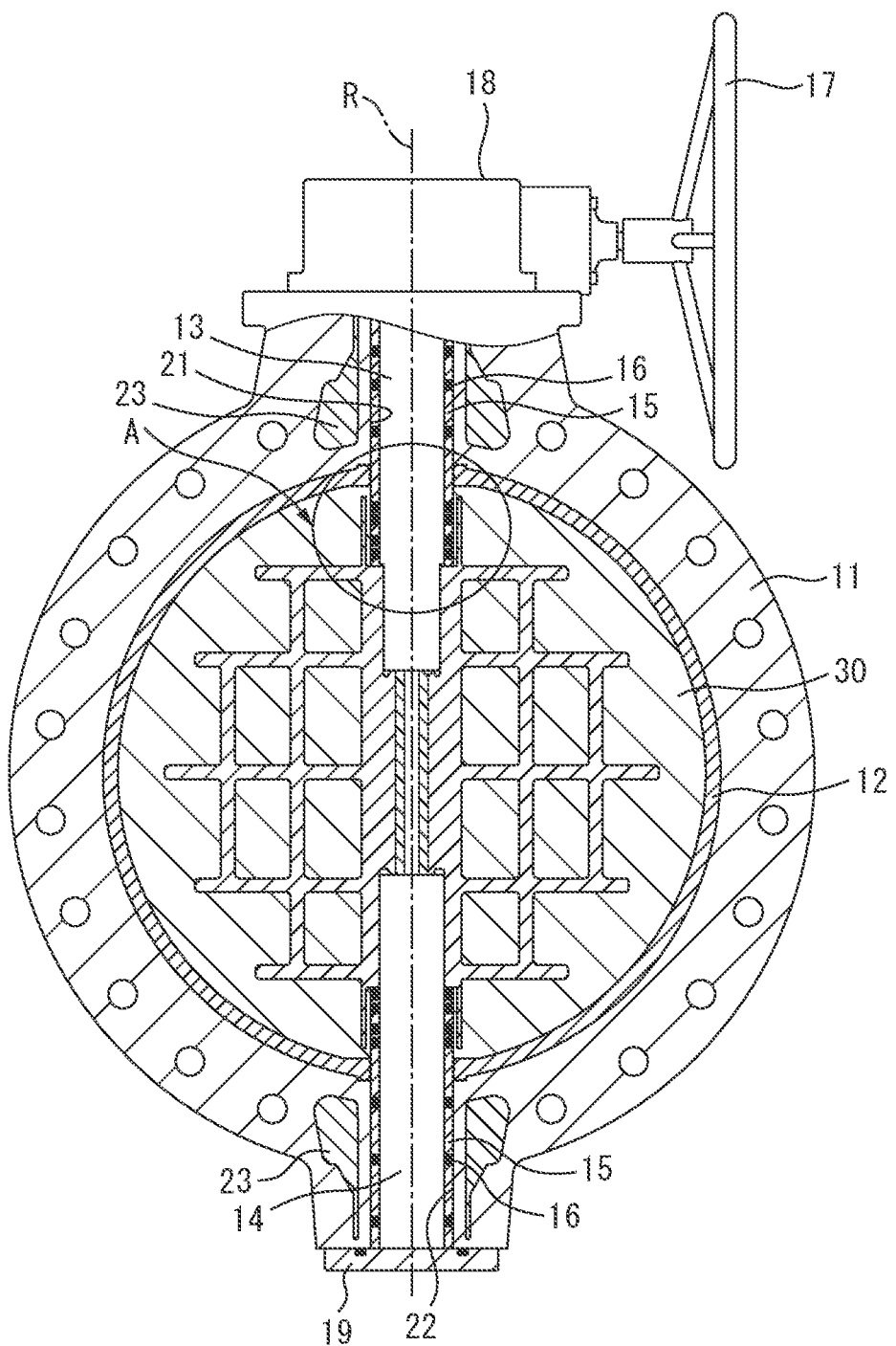
FIG. 1 is a front partial sectional view of a butterfly valve according to an embodiment of the present invention at the time of closing.

FIG. 1 is a front partial sectional view of a butterfly valve 10 according to the embodiment of the present invention and shows the state of the valve body 30 closing the flow path. This butterfly valve 10 comprises a substantially ring-shaped main body 11 having projecting parts at two locations at the top and bottom, a disk-shaped valve body 30, a top side first valve shaft 13 and bottom side second valve shaft 14 arranged on a rotational axis R, a substantially cylindrically shaped seat ring 12 sealing a clearance between the main body 11 and the valve body 30, plastic bushings 15 to which pluralities of O-rings 16 are attached and which are inserted over the valve shafts, a handle 17 connected to the top side first valve shaft 13, a gear mechanism 18 connected to it, and a valve shaft holder 19 arranged at a bottom of the main body 11 and supporting a bottom side second valve shaft 14 as main components. Note that, in FIG. 1, the handle 17 and the gear mechanism 18 are not shown in cross-section.

The main body 11 has body bearings 21, 22 at the top part and bottom part so as to support the inserted first and second valve shafts 13, 14 to be able to rotate through the bushings 15. The main body 11 of the present embodiment is formed as a plastic molded part. Inside surrounding the body bearings 21, 22, metal insert members 23 are included for reinforcement. The handle 17 connected to the top part of the main body 11 has the gear mechanism 18 for transmitting the rotational torque of a horizontally extending handle shaft to the vertically extending first valve shaft 13. Note that, the gear mechanism 18 is a conventional type of one comprised of a cylindrical worm and a worm wheel, so illustration of the inside is omitted. To transfer the rotational torque applied to the handle 17 to the valve body 30 by the first valve shaft 13, the first valve shaft 13 is supported through the bushing 15 to be able to rotate by the main body 11 while is connected to not be able to rotate with respect to the valve body 30. For this reason, the horizontal cross-sections of the bottom end of the first valve shaft 13 and a later explained first small diameter hole 33b of the valve body 30 in which this is inserted for engagement are formed noncircular. On the other hand, the second valve shaft 14 is supported through the bushing 15 to be able to rotate with respect to the main body 11 and with respect to the valve body 30. Therefore, the second valve shaft 14 is formed to a circular horizontal cross-sectional shape everywhere.

Figure 2:
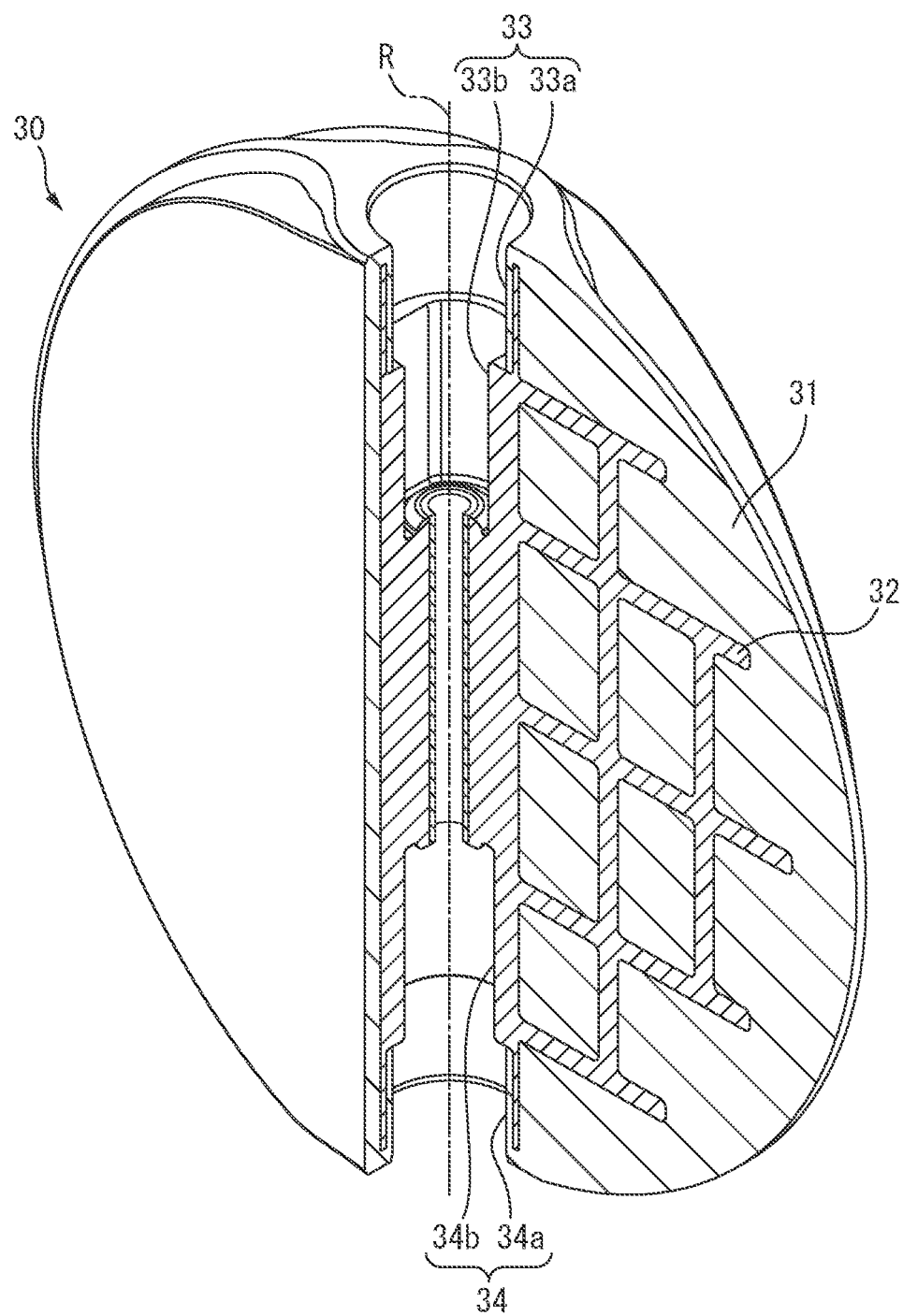
FIG. 2 is a perspective view including a partial cross-section of a valve body of the butterfly valve.

FIG. 2 is a perspective view including a partial cross-section of the valve body 30 of the butterfly valve 10 according to the present embodiment. The valve body 30 is integrally formed from a plastic contour forming member 31 forming a disk-shaped outside shape and a metal core member 32 surrounded by the contour forming member 31. The valve body 30 in the present embodiment is formed by injecting a plastic material for forming the contour forming member 31 into a mold for injection molding in which the core member 32 is preset. As the plastic material, in the present embodiment, PVDF (polyvinylidene fluoride), which has a high chemical resistance, is used. However, in the present invention, embodiments in which other plastic materials, for example, PP (polypropylene), PVC (polyvinyl chloride), PE (polyethylene), PFA (perfluoroalkoxyalkane), etc., are used are also possible. On the other hand, the core member 32 is formed from an aluminum alloy for casting use in the present embodiment. However, the material of the core member 32 is not limited to this. If having a mechanical strength higher than the contour forming member 31, it may be another metal material or further may be a nonmetallic material.

The valve body 30 has a first bearing hole 33 for supporting the top side first valve shaft 13 and a second bearing hole 34 for supporting the bottom side second valve shaft 14. These first and second bearing holes 33, 34 are formed coaxially with the rotational axis R. The first bearing hole 33 is comprised of a relatively large diameter first large diameter hole 33a including an open end into which the bushing 15 is inserted and supporting the first valve shaft 13 through the bushing 15 and a relatively small diameter first small diameter hole 33b extending further from the first large diameter hole 33a to the inside in the rotational axis R direction. The inner peripheral surface of the first large diameter hole 33a is formed by the contour forming member 31, while the inner peripheral surface of the first small diameter hole 33b is formed from the core member 32. The bushing 15 is not inserted in the first small diameter hole 33b. The tip side part of the first valve shaft 13 is directly inserted and fit into it. Further, in the present embodiment, the horizontal cross-sectional shape of the first small diameter hole 33b is formed into a noncircular double D-shape so that rotational torque from the first valve shaft 13 can be transmitted, in other words, a shape with two facing arc parts of a circle replaced by a chord.

The second bearing hole 34 is comprised of a relatively large diameter second large diameter hole 34a including an open end into which the bushing 15 is inserted and supporting the second valve shaft 14 through the bushing 15 and a relatively small diameter second small diameter hole 34b extending further from the second large diameter hole 34a to the inside in the rotational axis R direction. The second large diameter hole 34a is formed by the same structure and dimensions as the first large diameter hole 33a of the first bearing hole 33. On the other hand, the second small diameter hole 34b does not transmit rotational torque with the second valve shaft 14, so has a circular horizontal cross-sectional shape and differs from the first small diameter hole 33b of the first bearing hole 33 on this point.

The first bearing hole 33 and the second bearing hole 34 have similar configurations as explained above except that the first small diameter hole 33b and the second small diameter hole 34b differ in horizontal cross-sectional shapes. Below, the first bearing hole 33 will be explained as a representative example. For the valve shaft, the first valve shaft 13 will be used as a representative example. Further, to simplify the description, the ordinal "first" included in the names of the components will be omitted in the explanation. However, this does not apply when it is necessary to discriminate between the "first" and "second".

Figure 3:
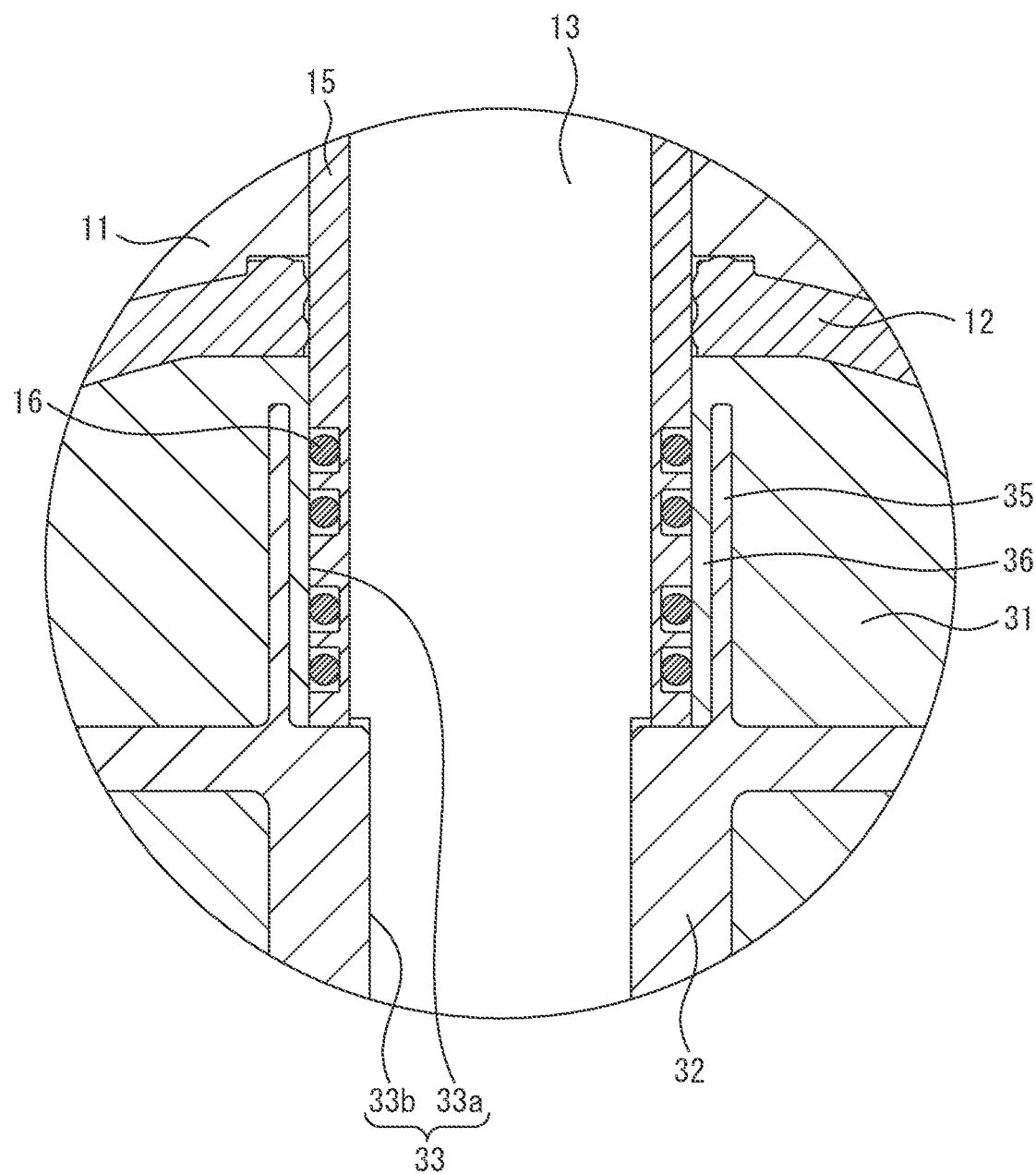
FIG. 3 is an enlarged view of a part A of FIG. 1.

Each bushing 15 in the present embodiment is made using polyvinylidene fluoride (PVDF) having high resistance to a corrosive fluid as a material. The bushing 15 is provided with the plurality of O-rings 16 so that the fluid does not enter to the inside of the valve body 30 and so that it does not touch the valve shaft 13. In particular, as shown in FIG. 3, four O-rings 16 are arranged at the part of the bushing 15 inserted into the large diameter hole 33a of the bearing hole 33. However, for example, if the valve shaft 13 is made from a material having a high corrosion resistance and, therefore, fluid is allowed to contact the valve shaft 13 and if rotational torque is allowed to act on the O-rings, an embodiment not using the bushing 15 is also possible. In this case, O-ring-use grooves may be formed in the valve shaft and O-rings may be directly fit at the valve shaft. In actuality, the valve shaft 13 can be fabricated by lathe-turning, so it is also possible to select as that material a material such as stainless steel having a high corrosion resistance.

The inner peripheral surface of the large diameter hole 33a of the bearing hole 33, as explained above, is formed by the contour forming member 31. As shown in detail in FIG. 3, the cylindrically shaped part of the core member 32 is arranged radially outside from the inner peripheral surface of the large diameter hole 33a. In the Description, the cylindrically shaped part 35 of the core member 32 is called the "bearing reinforcing part". Further, a cylindrically shaped part 36 of the contour forming member 31 between the inner peripheral surface of the large diameter hole 33a and the cylindrically shaped bearing reinforcing part 35 is called the "bearing inner peripheral part". The bearing reinforcing part 35 of the core member 32 is provided for reinforcing the bearing inner peripheral part 36. When the shear force and bending moment generated at the valve body 30 based on the pressure acting from the fluid on the valve body 30 are supported by the large diameter hole 33a, the force acting from the valve shaft 13 to the large diameter hole 33a and bearing inner peripheral part 36 is supported by the bearing reinforcing part 35, so deformation of the bearing inner peripheral part 36 is suppressed and the seal with the bushing 15 by the O-rings 16 can be reliably maintained. In particular, in the present embodiment, the valve shaft 13 is supported by the small diameter hole 33b as well, so it will be understood that the force acting on the bearing inner peripheral part 36 is reduced more.

In this way, the bearing reinforcing part 35 greatly contributes to the support of the shear force and bending moment, so the wall thickness at the bearing inner peripheral part 36 can be made thinner. As a result, it becomes possible to avoid an increase in the outside dimensions of the bearing hole 33 of the valve body 30 and the accompanying increase in the flow resistance at the time of valve opening. While not shown, if viewed by a cross-section rotated from FIG. 3 about the rotational axis R by 90 degrees, the wall thickness at the bearing inner peripheral part 36 is formed thinner than the wall thickness of the contour forming member 31 at the outer circumferential side of the bearing reinforcing part 35.

Figure 4:
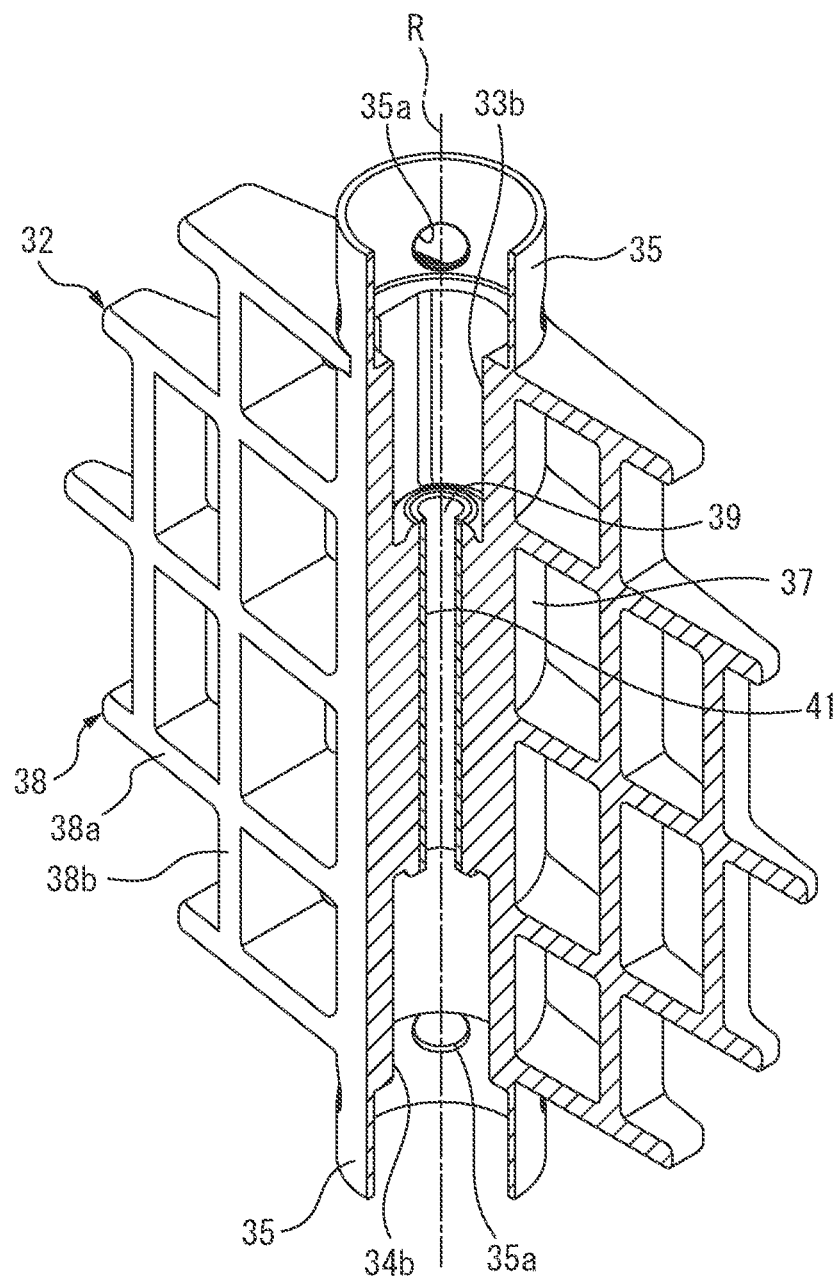
FIG. 4 is a perspective view including a partial cross-section of a core member contained inside the valve body.

Next, referring to the perspective view including the partial cross-section of the core member 32 shown in FIG. 4, the core member 32 will be explained below in further detail. The core member 32 has a rod-shaped center part 37 extending along the rotational axis R and two main reinforcing parts 38 extending substantially in the plane including the rotational axis R symmetrically to the left and right at the two sides of the center part 37. At the top end and the bottom end of the rod-shaped center part 37, the above-mentioned bearing reinforcing parts 35 are provided.

Each main reinforcing part 38 is comprised of five horizontal members 38a extending horizontally from the rod shaped center part 37 and two vertical members 38b extending in the rotational axis R direction for connecting these horizontal members 38a—all formed in a lattice shape. The five horizontal members 38a differ in lengths in accordance with the outside diameter of the circle of the valve body 30 and further have base parts substantially equal to the outside diameter of the center part 37 and are tapered to become narrower from the base parts to the tip parts. Since the core member 32 is formed in this way, a relatively light weight and small material can be used to effectively support the force acting from the fluid on the valve body 30.

The first small diameter hole 33b of the first bearing hole 33 and the second small diameter hole 34b of the second bearing hole 34 are connected in the present embodiment by a vertical hole 39 extending coaxially with the rotational axis R. In this vertical hole 39 of the core member 32, a metal pipe member 41 is buried. The material of the pipe member 41 has a higher vertical elastic modulus and tensile strength than the material of the core member 32. Further, the pipe member 41, in the present embodiment, is cast in when casting the core member 32 to be assembled into the core member 32. Due to this vertical hole 39 and pipe member 41, lightening of the weight of the core member 32 and improvement of the casting ability can be realized without causing a drop in strength of the core member 32. However, an embodiment of a core member where no vertical hole 39 is formed is also possible in the present invention.

Each bearing reinforcing part 35, in the present embodiment, is provided with a plurality of through holes 35a connecting the inner peripheral surface and the outer peripheral surface. These through holes 35a are provided so as to form passageways for plastic material forming the bearing inner peripheral part 36 when setting the core member 32 in a mold (not shown) and injection molding the contour forming member 31. At the time of injection molding, the plastic material forming the bearing inner peripheral part 36 can flow into the cylindrically shaped cavity for forming the bearing inner peripheral part 36 not only by routes from the outer circumferential side of the bearing reinforcing part 35 over the end face, but also by routes running through the through holes 35a. For this reason, even when the bearing inner peripheral part 36 is thin in thickness and therefore the width of the cavity is narrow or when the large diameter hole 33a (and therefore the cavity) is deep in depth, the plastic material reliably flows into the cavity and the bearing inner peripheral part 36 can be formed without allowing insufficient filling. In particular, when, like in the present embodiment, the core member 32 is formed by a relatively small amount of material and the valve body 30 is formed so that the ratio of the contour forming member 31 in the valve body 30 becomes relatively large, it easily becomes difficult for the plastic material to flow into the cavity, so provision of through holes 35a is particularly effective. However, in the present invention, such through holes 35a are not essential. For example, if the thickness of the bearing inner peripheral part 36 is relatively great or the depth of the large diameter hole 33a of the bearing hole 33 is relatively shallow, even without such through holes 35a, insufficient filling will not occur.

In the butterfly valve 10 according to the present invention, the large diameter hole 33a of the bearing hole 33 of the valve body 30 is formed by the contour forming member 31 made of a plastic material without the metal core member 32 being exposed, while the bearing reinforcing part 35 made of the core member 32 is arranged at the inside, that is, radially outside. For this reason, the large diameter hole 33a of the bearing hole 33 has a sufficient corrosion resistance, while, even if controlling the flow of high temperature fluid, no deformation is caused and therefore a high sealing ability can be maintained. In particular, it becomes possible to effectively keep the opening edge of the large diameter hole 33a from deforming, so the sealing ability between the O-ring attached to the bushing 15 and the inner peripheral surface of the large diameter hole 33a of course and also the sealing ability between the opening edge and seat ring 12 can be reliably maintained. Further, the plastic material forming the bearing inner peripheral part 36 is connected with the surrounding plastic material. This also contributes to keeping the large diameter hole 33a of the bearing hole 33 from deforming.

In the present embodiment, the core member 32 is exposed at the small diameter hole 33b of the bearing hole 33. This is because it is usually not necessary to consider entry of fluid to the small diameter hole 33b due to the above-mentioned high sealing ability of the large diameter hole 33a. However, in the present invention, an embodiment where not only the large diameter hole 33a of the bearing hole 33 of the valve body, but also the inner peripheral surface of the small diameter hole 33b is formed from the contour forming member 31 is also possible. In this case, to promote the filling of the plastic material to the bearing inner peripheral part of the small diameter hole 33b, for example, it is preferable to form the above-mentioned through hole 35a at the center part 37 of the core member 32 around the small diameter hole 33b as well. Further, in the case of an embodiment where no vertical hole 39 is formed at the center part 37 of the core member 32, the small diameter hole 33b is formed as a closed bottom hole, so not only the inner peripheral surface of the small diameter hole 33b, but also the bottom surface may be formed by the contour forming member.

On the other hand, an embodiment where part of the large diameter hole 33a of the bearing hole 33, for example, just the top half, is formed by the contour forming member 31 and the remaining part of the large diameter hole 33a is formed by the core member 32 is also possible.

Figure 5:
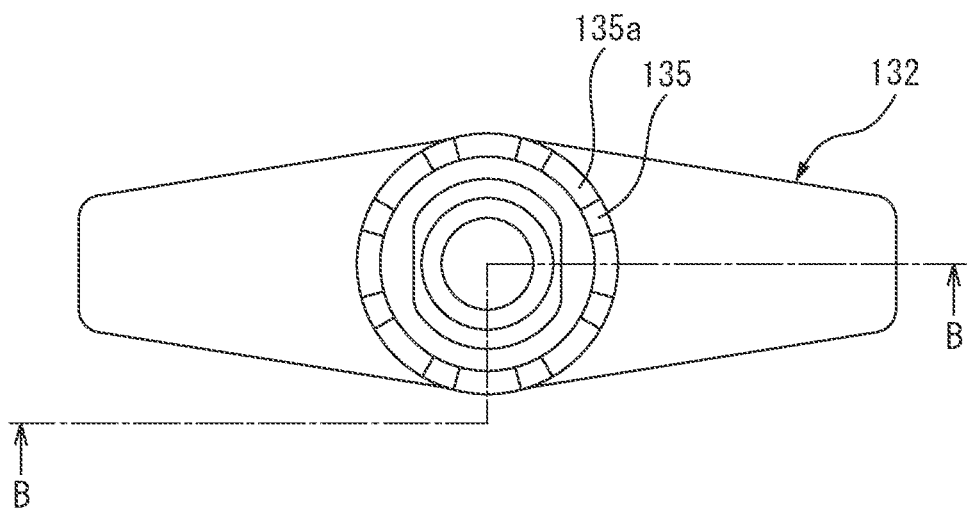
FIG. 5 gives (a) a plan view and (b) a sectional view along B-B of a core member of a first modification of the embodiment of the present invention.
Figure 5:
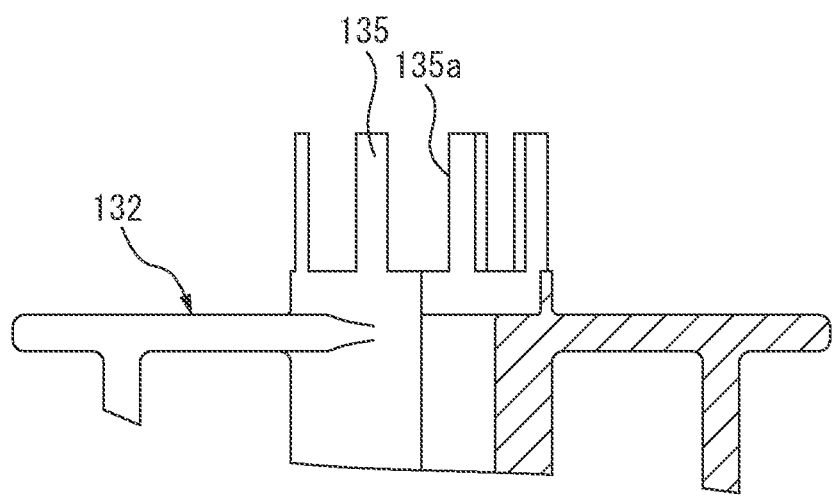
Figure 6:
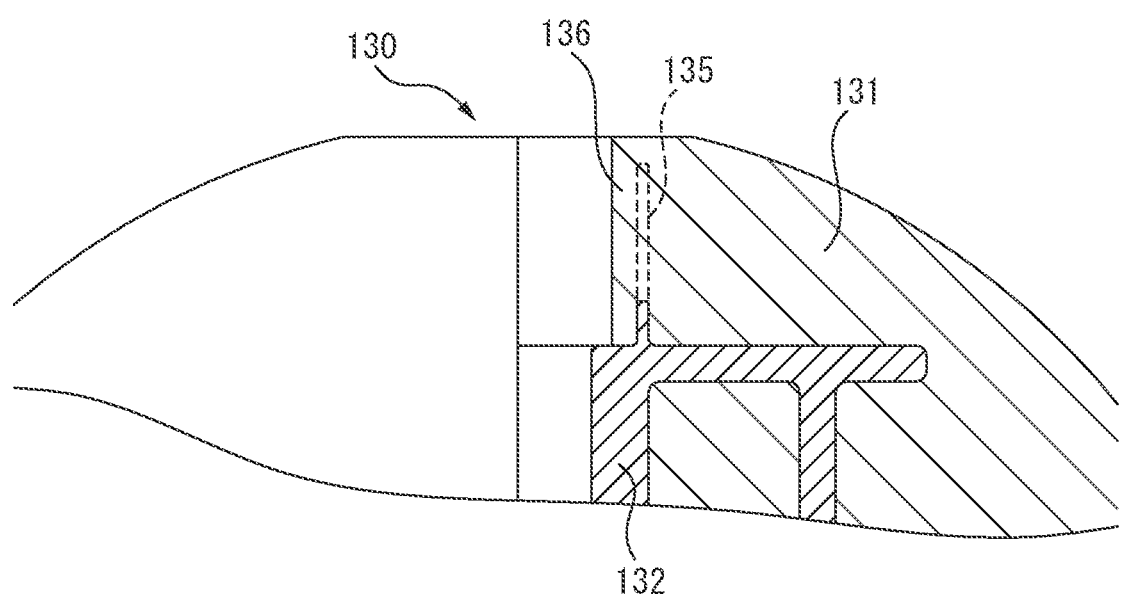
FIG. 6 is a front view including a partial cross-section of a top part of a valve body in the first modification.

Next, a first modification of the above-mentioned embodiment of the present invention will be explained below referring to FIG. 5 and FIG. 6. Drawing (a) in FIG. 5 is a plan view of a core member 132 of the first modification, while drawing (b) in FIG. 5 is a sectional view along B-B of (a) and shows the top part of the core member 132. FIG. 6 is a partial sectional front view of a top part of a valve body 130 at which a contour forming member 131 is formed by injection molding. The first modification differs from the above-mentioned embodiment in the shape of a bearing reinforcing part 135 of the core member 132 of the valve body 130. The bearing reinforcing part 135 of the first modification has a plurality of notches 135a extending from the end face in the rotational axis R direction. In the example shown in FIG. 5, eight notches 135a formed into rectangular shapes are provided. Due to these notches 135a, the inner peripheral surface and the outer peripheral surface of the bearing reinforcing part 135 are communicated, so at the time of injection molding of the contour forming member 131, the plastic material can flow through these notches 135a and therefore filling of the plastic material to the bearing inner peripheral part 136 is promoted.

Figure 7:
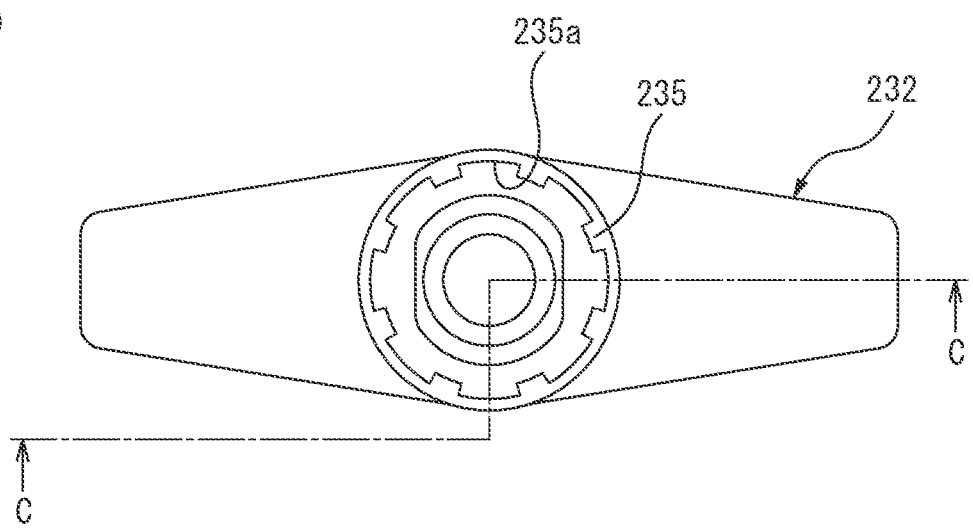
FIG. 7 gives (a) a plan view and (b) a sectional view along C-C of a core member of a second modification of the embodiment of the present invention.
Figure 7:
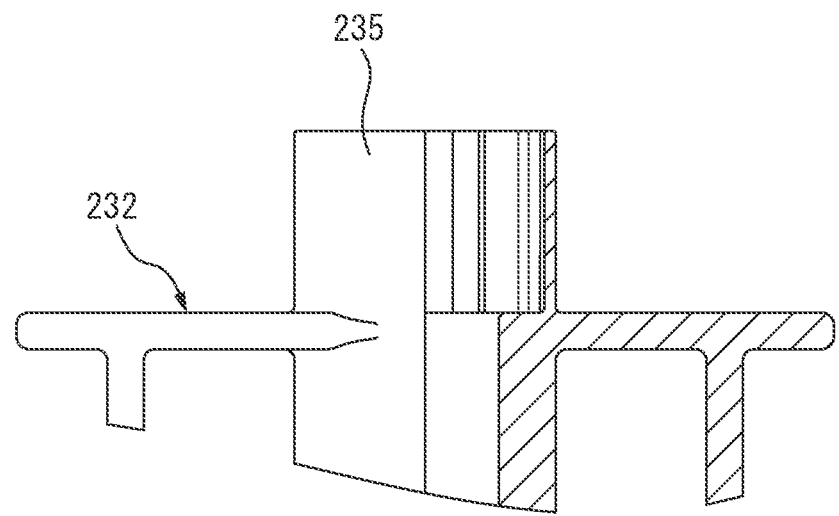
Figure 8:
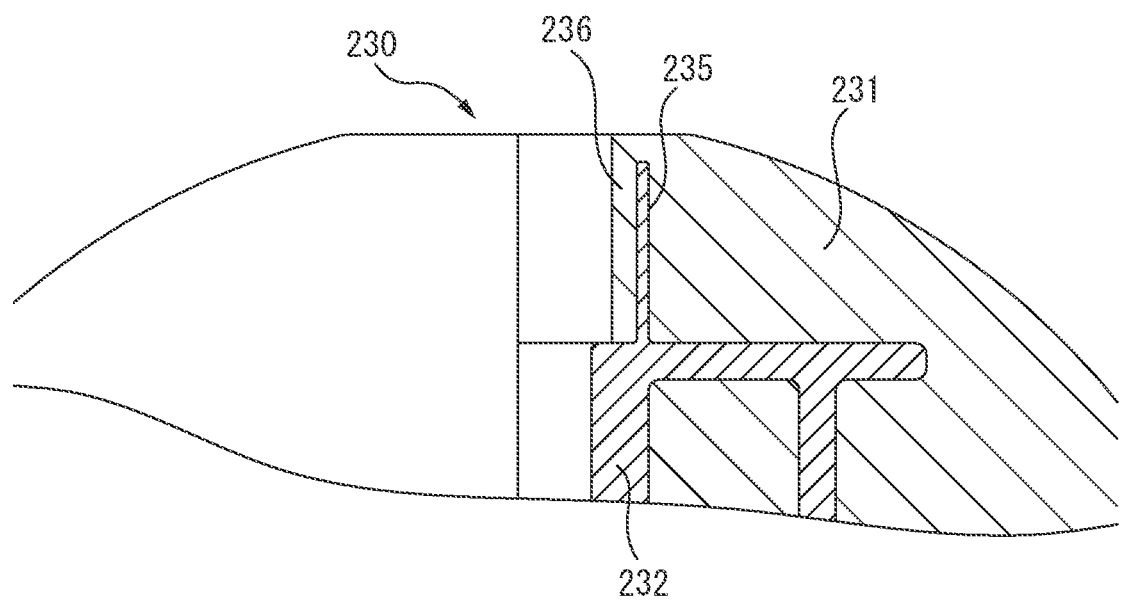
FIG. 8 is a front view including a partial cross-section of a top part of a valve body in the second modification.

Next, a second modification of the above-mentioned embodiment of the present invention will be explained below while referring to FIG. 7 and FIG. 8. Drawing (a) in FIG. 7 is a plan view of a core member 232 of the second modification, while drawing (b) in FIG. 7 is a sectional view along C-C of (a) and shows the top part of the core member 232. FIG. 8 is a partial sectional front view of the top part of a valve body 230 in which a contour forming member 231 is formed by injection molding. A bearing reinforcing part 235 of the second modification has a plurality of grooves 235a extending in the rotational axis R direction starting from the end face of the cylinder at the inner peripheral surface. In the example shown in FIG. 7, eight grooves 235a having rectangular cross-sections are provided. Due to these grooves 235a, a part with a greater thickness is formed at a bearing inner peripheral part 236 of the contour forming member 231. As a result, at the time of injection molding of the contour forming member 231, filling of the plastic material to the bearing inner peripheral part 236 is promoted.

Figure 9:
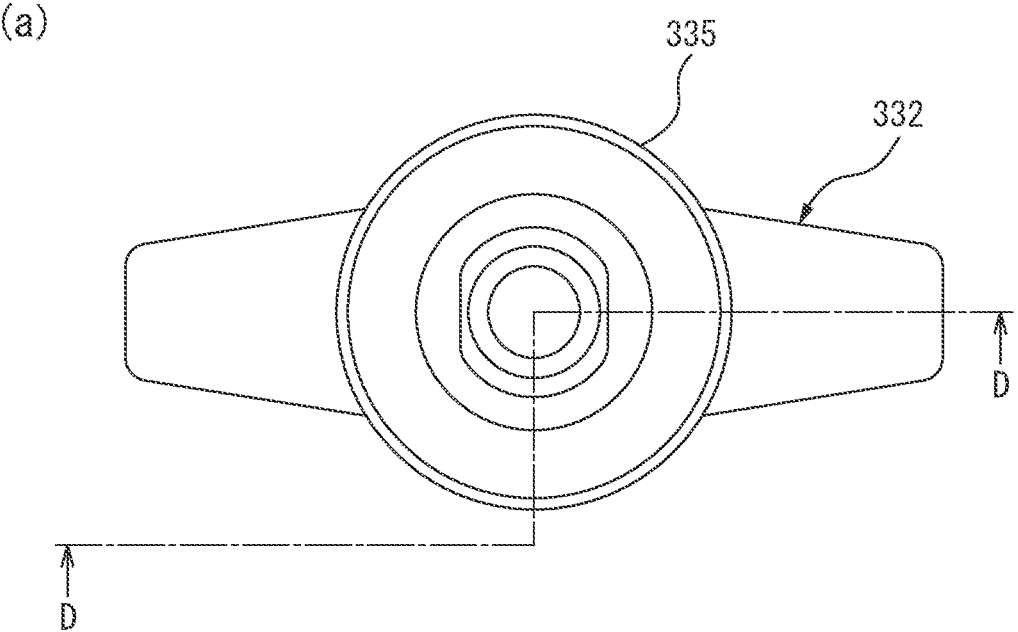
FIG. 9 gives (a) a plan view and (b) a sectional view along D-D of a core member of a third modification of the embodiment of the present invention.
Figure 9:
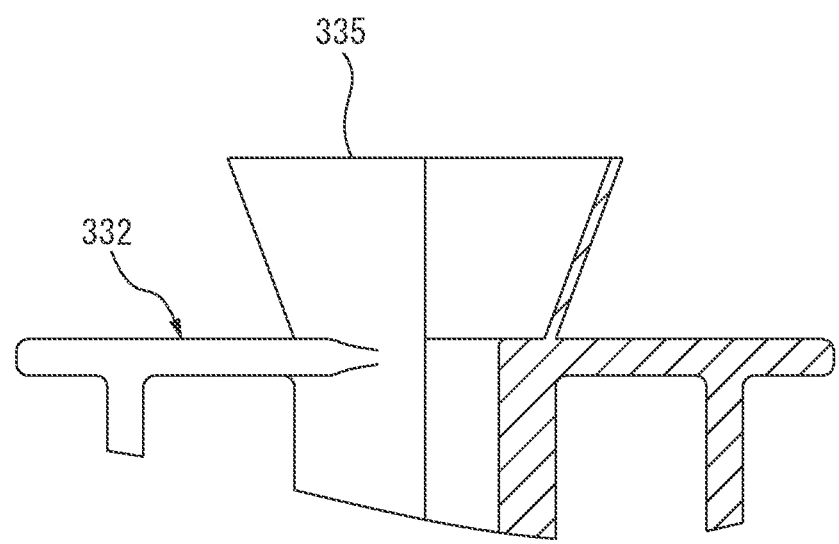
Figure 10:
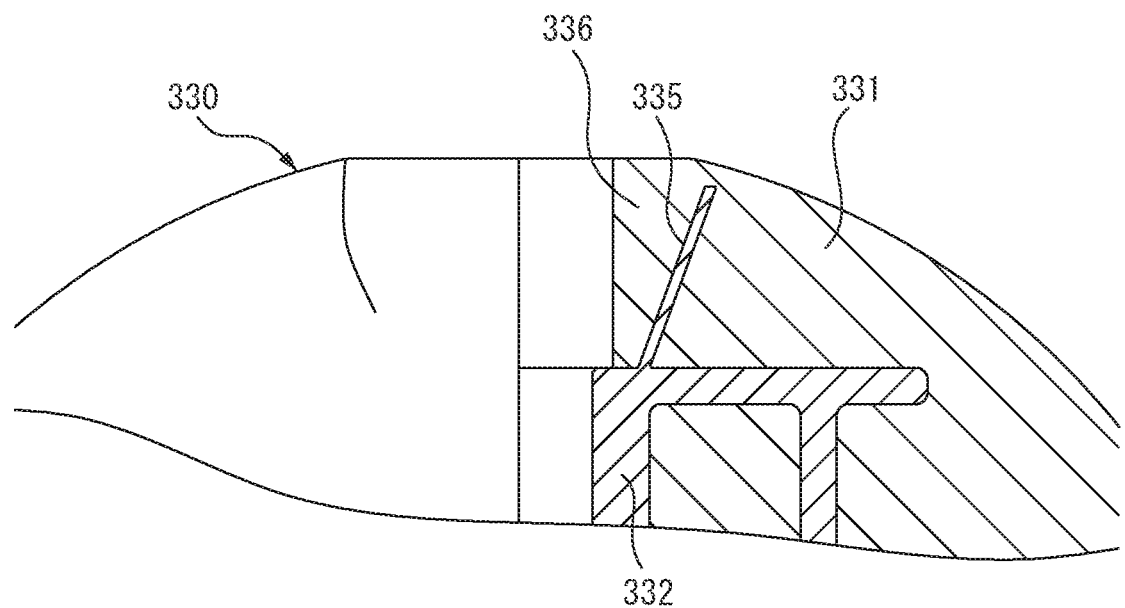
FIG. 10 is a front view including a partial cross-section of a top part of a valve body in the third modification.

Next, a third modification of the above-mentioned embodiment of the present invention will be explained below while referring to FIG. 9 and FIG. 10. Drawing (a) in FIG. 9 is a plan view of a core member 332 of the third modification, while drawing (b) in FIG. 9 is a sectional view along the line D-D of (a) and shows the top part of the core member 332. FIG. 10 is a partial sectional front view of a top part of a valve body 330 in which a contour forming member 331 is formed by injection molding. A bearing reinforcing part 335 of the third modification is expanded in diameter continuously toward the end face of that cylinder. By the bearing reinforcing part 335 being expanded in diameter in this way, a part with a large thickness is formed at a bearing inner peripheral part 336 of the contour forming member 331. As a result, at the time of injection molding of the contour forming member 331, filling of the plastic material in the bearing inner peripheral part 336 is promoted. Further, in FIG. 9, the bearing reinforcing part 335 is expanded in diameter continuously, but a modification in which the bearing reinforcing part 335 is expanded in diameter in steps is also possible.

Figure 11:
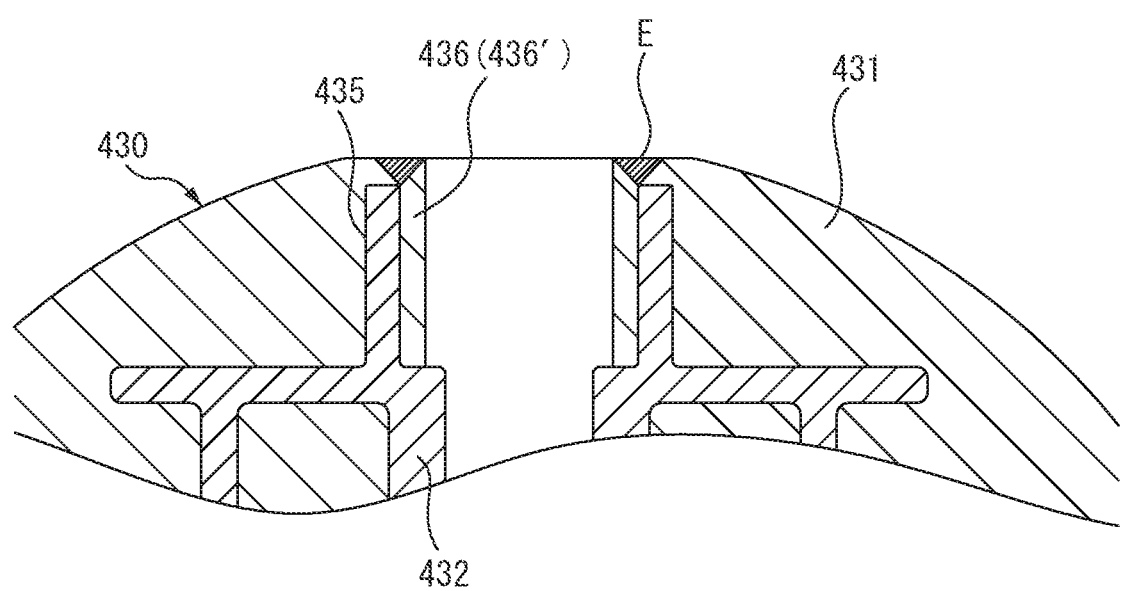
FIG. 11 is a front sectional view of a top part of a valve body in a fourth modification.

Next, a fourth modification of the above-mentioned embodiment of the present invention will be explained below with reference to FIG. 11. The fourth modification differs from the above-mentioned embodiment and modifications in the method of production of a bearing inner peripheral part 436. The bearing inner peripheral part 436 of a valve body 430 of the fourth modification is not formed by injection molding, but is formed by press-fitting a plastic bushing 436' and melt bonding it. For this reason, in the fourth modification, a contour forming member 431 of the initial valve body 430 does not have a bearing inner peripheral part 436. The bearing inner peripheral part 436 is formed by press-fitting the plastic material bushing 436' into the inner circumferential side of a bearing reinforcing part 435 of a core member 432 and further by melt bonding the surrounding contour forming member 431 and the opening side end E to form an integral unit. According to this, there is no need to consider the fluidity or filling ability of the material at the bearing inner peripheral part. Note that, a modification where the bushing 436' is not melt bonded with the surrounding contour forming member 431, but is adhered to it to form an integral unit is also possible in the present invention.

Next, a fifth modification of the above-mentioned embodiment of the present invention will be explained below. In the fifth modification (not shown), a first large diameter hole of a first bearing hole is formed by machining. For this reason, in the fifth modification, a valve body in which all of the first large diameter hole is filled with a plastic material at the time of injection molding of a contour forming member is prepared, then a first large diameter hole is formed by machining. According to this, there is no need to consider the fluidity or filling ability of the material at the bearing inner peripheral part.

In the above-mentioned embodiment and its modifications, the first large diameter hole of the first bearing hole is circular in horizontal cross-sectional shape, but an embodiment in which the horizontal cross-sectional shape is square or a D-shape or double D shape or spline hole or other noncircular shape is also possible. In this case, the first small diameter hole can be eliminated.

REFERENCE SIGNS LIST 10 butterfly valve
11 main body 13 first valve shaft
14 second valve shaft
15 bushing
30 valve body
31 contour forming member
32 core member
33 first bearing hole
33a first large diameter hole
33b first small diameter hole
34 second bearing hole
34a second large diameter hole
34b second small diameter hole
35 bearing reinforcing part
35a through hole
36 bearing inner peripheral part

The invention claimed is:

1. A butterfly valve comprising:
a main body;
a valve shaft; and
a valve body able to rotate with respect to the main body, wherein
the valve body is integrally formed from a core member and a contour forming member made of a plastic material surrounding the core member to form a contour of the valve body and has a bearing hole supporting the valve shaft,
the contour forming member has a cylindrically shaped bearing inner peripheral part forming at least part of an inner peripheral surface of the bearing hole,
the contour forming member is continuously formed including also the bearing inner peripheral part,
the core member has a bearing reinforcing part supporting the bearing inner peripheral part of the contour forming member from radially outside of a rotational axis of the valve body, and
the bearing hole of the valve body comprises a larger diameter part including an open end into which a bushing is inserted and supporting the valve shaft through the bushing and a smaller diameter part extending further from the larger diameter part to an inside in a direction of a rotational axis of the valve body and supporting the valve shaft, wherein an inner peripheral surface of the larger diameter part is formed by the bearing inner peripheral part of the contour forming member, while an inner peripheral surface of the smaller diameter part is formed by the core member.

2. The butterfly valve according to claim 1, wherein the bearing reinforcing part of the core member has a through hole connecting an inner peripheral surface and an outer peripheral surface of the bearing reinforcing part.

3. The butterfly valve according to claim 1, wherein the bearing reinforcing part of the core member has a notch connecting an inner peripheral surface and an outer peripheral surface of the bearing reinforcing part.

4. The butterfly valve according to claim 1, wherein the bearing reinforcing part of the core member has a groove extending in substantially the rotational axis direction starting from an end face of the bearing reinforcing part in the rotational axis direction at an inner peripheral surface of the bearing reinforcing part.

5. The butterfly valve according to claim 1, wherein the bearing reinforcing part of the core member is expanded in diameter continuously or in steps the further toward an end face of the bearing reinforcing part in the rotational axis direction.

6. The butterfly valve according to claim 2, wherein a wall thickness of the bearing inner peripheral part of the contour forming member is smaller than a wall thickness of a part of the contour forming member at an outer circumferential side of the bearing reinforcing part of the core member.

7. The butterfly valve according to claim 1, wherein a seal member is placed between the bearing inner peripheral part and the bushing inserted over the valve shaft.

8. The butterfly valve according to claim 1, wherein
the core member has a rod shaped center part extending along the rotational axis, main reinforcing parts extending substantially along a plane including the rotational axis at the two sides of the rod shaped center part, and the bearing reinforcing part, and
the main reinforcing part is formed in a lattice shape.

9. The butterfly valve according to claim 8, wherein
the core member is formed as a casting,
the core member includes a cast-in pipe member inside of the rod shaped center part, and
the pipe member is comprised of a material harder than the core member.

* * * * *